(12) United States Patent
Taniguchi et al.

(10) Patent No.: US 9,579,972 B2
(45) Date of Patent: Feb. 28, 2017

(54) STRUCTURE FOR MOUNTING FUEL TANK ON VEHICLE BODY AND DEVICE FOR PREVENTING DEFORMATION OF FUEL TANK

(71) Applicant: Yachiyo Industry Co., Ltd., Sayama-shi, Saitama (JP)

(72) Inventors: Yohei Taniguchi, Sakura (JP); Kazuyoshi Morooka, Sakura (JP); Kunio Takeda, Sakura (JP)

(73) Assignee: Yachiyo Industry, Co., Ltd., Saitama (JP)

( * ) Notice: Subject to any disclaimer, the term of this patent is extended or adjusted under 35 U.S.C. 154(b) by 0 days.

(21) Appl. No.: 14/764,249

(22) PCT Filed: Sep. 24, 2013

(86) PCT No.: PCT/JP2013/005635
§ 371 (c)(1),
(2) Date: Jul. 29, 2015

(87) PCT Pub. No.: WO2014/118830
PCT Pub. Date: Aug. 7, 2014

(65) Prior Publication Data
US 2015/0367726 A1    Dec. 24, 2015

(30) Foreign Application Priority Data
Jan. 31, 2013  (JP) ................................. 2013-017400

(51) Int. Cl.
*B60K 15/067* (2006.01)
*B60K 15/063* (2006.01)

(52) U.S. Cl.
CPC .... *B60K 15/067* (2013.01); *B60K 2015/0634* (2013.01); *B60K 2015/0636* (2013.01);
(Continued)

(58) Field of Classification Search
CPC .......... B60K 15/067; B60K 2015/0675; B60K 2015/0636; B60K 2015/0634
See application file for complete search history.

(56) References Cited

U.S. PATENT DOCUMENTS 3,697,093 A * 10/1972 Cadiou ................ B60K 15/067
                                                    280/834
4,371,181 A *  2/1983 Monigold .............. B60K 15/06
                                                    137/572
(Continued)

FOREIGN PATENT DOCUMENTS

JP    011989069029    10/1987
JP      1993294150     4/1992
(Continued)

OTHER PUBLICATIONS

PCT/JP2013/005635 International Search Report. Jan. 7, 2014 (5 pages) (With English Abstract).

*Primary Examiner* — Kevin Hurley
*Assistant Examiner* — Gabriela C Craciun
(74) *Attorney, Agent, or Firm* — Dority & Manning, P.A.

(57) ABSTRACT

To provide a structure for mounting a fuel tank on a vehicle body that can prevent harmful deformation of the fuel tank that would impair the function of the fuel tank in either case where the pressure in the fuel tank changes to a positive pressure or to a negative pressure, the structure for mounting a fuel tank on a vehicle body includes: a band lower (10L) secured to the vehicle body, extending along at least a lower wall (19L) of the fuel tank (1) and holding the fuel tank (1); a lower wall connecting means (40) that connects at least one part of the lower wall (19L) of the fuel tank (1) to the band lower (10L); a holding member (50) secured to the vehicle body and holding the fuel tank (1); and an upper wall (Continued)

connecting means (40) that connects at least one part of the upper wall (19U) of the fuel tank (1) to the holding member.

9 Claims, 11 Drawing Sheets

(52) U.S. Cl.
CPC .................. *B60K 2015/0675* (2013.01); *Y10T 137/85978* (2015.04)

(56) References Cited

U.S. PATENT DOCUMENTS

| | | | | |
|---|---|---|---|---|
| 5,556,133 | A * | 9/1996 | Oku | B60K 15/063 |
| | | | | 280/781 |
| 6,099,042 | A * | 8/2000 | Cook | B60K 15/067 |
| | | | | 280/834 |
| 7,063,355 | B2 * | 6/2006 | Hashimura | B60K 15/063 |
| | | | | 280/830 |
| 2005/0258630 | A1 * | 11/2005 | Choi | B60K 15/067 |
| | | | | 280/834 |
| 2009/0114784 | A1 * | 5/2009 | Tam | B60K 15/067 |
| | | | | 248/205.1 |
| 2012/0192966 | A1 * | 8/2012 | Siebeneick | B60K 15/067 |
| | | | | 137/376 |
| 2014/0103628 | A1 * | 4/2014 | De Biasi | B60K 15/067 |
| | | | | 280/834 |
| 2014/0196972 | A1 * | 7/2014 | Sangha | B60K 13/06 |
| | | | | 180/309 |
| 2016/0039282 | A1 * | 2/2016 | Mathew | B60K 15/07 |
| | | | | 248/313 |

FOREIGN PATENT DOCUMENTS

| | | |
|---|---|---|
| JP | 1997114227 | 10/1996 |
| JP | 2006001381 | 6/2004 |
| JP | 2010221889 | 3/2009 |
| JP | 2011093409 | 10/2009 |

* cited by examiner

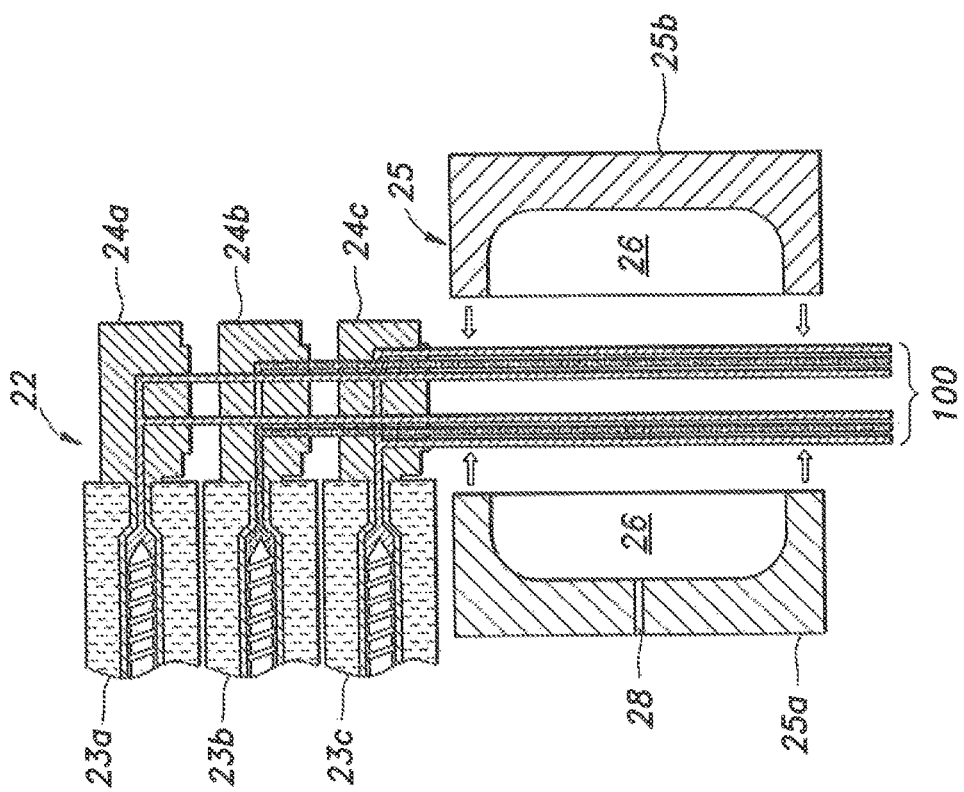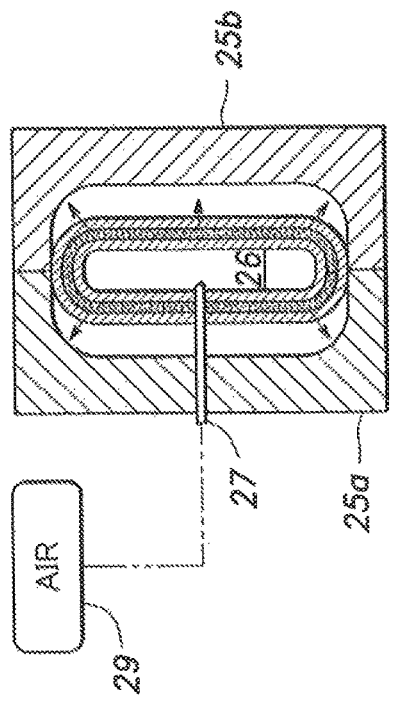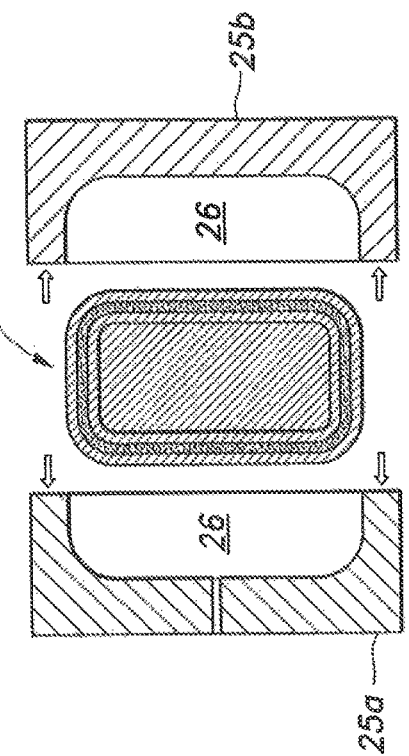

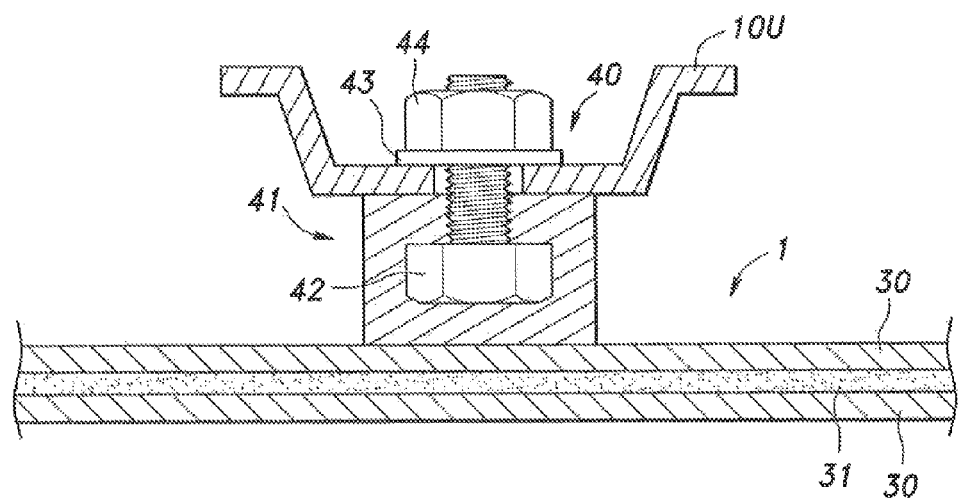
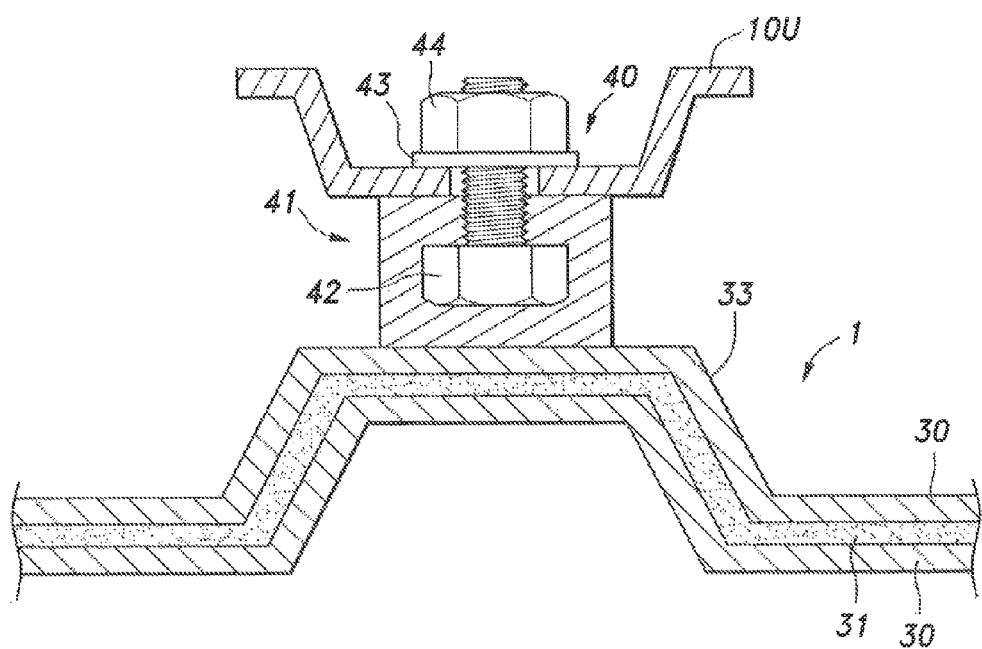

STRUCTURE FOR MOUNTING FUEL TANK ON VEHICLE BODY AND DEVICE FOR PREVENTING DEFORMATION OF FUEL TANK

CROSS REFERENCE TO RELATED APPLICATIONS

This application is the U.S. National Stage entry of International Application Number PCT/JP2013/005635 filed under the Patent Cooperation Treaty having a filing date of Sep. 24, 2013, which claims priority to Japanese Patent Application Serial Number 2013-017400 having a filing date of Jan. 31, 2013, both of which are hereby incorporated by reference herein in their entirety for all purposes.

TECHNICAL FIELD

The present invention relates to a structure for mounting a fuel tank on a vehicle body and a device for preventing deformation of a fuel tank.

BACKGROUND ART

A structure is known in which, to mount a fuel tank on a vehicle body, a band is passed through a groove formed in a surface of the fuel tank and the both ends of the band are bolted to the vehicle body such that the fuel tank is securely mounted with the surface of the fuel tank being pressed against the vehicle body via a rubber cushion (Patent Document 1). According to Patent Document 1, this structure can suppress an independent oscillation of the fuel tank.

Also known is a structure in which ends of two upper bands passed along an upper surface of a fuel tank in the fore-and-aft direction of the vehicle body are overlapped with corresponding ends of two lower bands passed along a lower surface of the fuel tank in the fore-and-aft direction of the vehicle body, and the front ends of the bands are fastened to the first cross member of the vehicle by means of bolts and nuts while the rear ends of the bands are fastened to the second cross member in a similar manner (Patent Document 2). According to Patent Document 2, this structure allows the fuel tank to be secured on the vehicle body.

Further, a structure is known in which a securing member, which has a metallic threaded member (such as a nut) embedded in a resin member integrally formed of multiple layers of permeation-resistant resin and weldable/adhesive resin, is welded onto an upper surface of a fuel tank, and the fuel tank is mounted on the vehicle body via the securing member (Patent Document 3). According to Patent Document 3, this structure allows the fuel tank to be mounted firmly on the vehicle body.

Also known is a structure for attaching an accessory component such as a protector onto an exterior of a fuel tank, which includes: a recess defined in the surface of the fuel tank; an accessory component having a through-hole and to be attached to the exterior of the fuel tank; a first fastener disposed on an inner side of the accessory component with respect to the fuel tank; and a second fastener disposed on an outer side of the accessory component, wherein the first and second fasteners sandwich the accessory component therebetween and extend through the through-hole to engage with a claw provided on an inner circumference of the recess (Patent Document 4). According to Patent Document 4, this structure allows the accessory component to be attached to the fuel tank by simply providing the surface of the fuel tank with a recess.

PRIOR ART DOCUMENTS

Patent Documents

Patent Document 1: JPH05-294150A
Patent Document 2: JP2010-221889A
Patent Document 3: JP2006-001381A
Patent Document 4: JP2011-093409A

BRIEF SUMMARY OF THE INVENTION

Task to be Accomplished by the Invention

However, in typical front-engine passenger vehicles, the fuel tank is often installed under the floor near the rear seat so as to be elongated sideways. This is to avoid damage in the event of a collision while reducing an influence of an amount of fuel on the position of the center of gravity of the vehicle body and the moment of inertia of the vehicle body. However, the installment of the fuel tank under the floor exposes the fuel tank to a change in the outside temperature and a temperature change due to the heat from the exhaust part.

Meanwhile, the material of the fuel tank is changing from a steel plate to a resin. This is because the tanks made of a resin have merits that they do not grow rust, are light in weight, and can be mass-produced at low cost even if they have a complicated shape, although they may be somewhat inferior to those made of a steel sheet with regard to the strength against penetration and breakage.

Meanwhile, it is known that the atmospheric pressure in the fuel tank increases and decreased due to the aforementioned outside temperature change or the like. Particularly, when the fuel tank is made of resin, the fuel tank will expand and contract in response to the change in the atmospheric pressure, which may result in deformation of the fuel tank.

Further, it is known that, in such a case where the activated carbon filter filled in the canister for recovering the gasoline vapor generated in the fuel tank is clogged up completely, for example, the pressure in the fuel tank may become negative along with transportation of gasoline from the fuel tank by the pump module. If the discharging power of the pump module is enhanced along with adoption of an electronically controlled fuel injection system or the like, the fuel may continue to be forcefully discharged even when the pressure in the fuel tank becomes negative, and this may damage the fuel tank.

An electric component such as the pump module for supplying fuel to the engine is attached to the fuel tank. Thus, if the pressure in the fuel tank becomes negative and the fuel tank undergoes contracting deformation, the joint between the pump module and the fuel tank or the like may be damaged even if it does not lead to the damage to the fuel tank mentioned above.

With regard to such deformation of the fuel tank, in the structure disclosed in Patent Document 1, the band may constrain the fuel tank to some extent. However, the band presses the fuel tank via an elastic cushion member, and thus, cannot prevent the deformation of the fuel tank.

In the structure disclosed in Patent Document 2, the bands are provided along the fuel tank to surround the circumference of the fuel tank, and thus, it is considered capable of preventing the expanding deformation of the fuel tank when the pressure in the fuel tank becomes positive. However, when the pressure in the fuel tank becomes negative, the structure disclosed in Patent Document 2 cannot prevent the contracting deformation of the fuel tank.

Also, in the structure disclosed in Patent Document 3, if at least the upper surface of the fuel tank is connected with a highly rigid member of the vehicle body, it is considered that the highly rigid member will prevent the expanding or contracting deformation of the upper surface of the fuel tank. However, it is still not possible to prevent the deformation of the under surface of the fuel tank in either case where the deformation is expanding or contracting.

Further, in the structure disclosed in Patent Document 4, when the fuel tank undergoes an expanding or contracting deformation, the fasteners themselves are deformed together with the deformation of the fuel tank, and thus, cannot prevent the deformation of the fuel tank.

The present invention is made to solve the aforementioned problems in the prior art, and a primary object of the present invention is to provide a structure for mounting a fuel tank on a vehicle body and a device for preventing deformation of a fuel tank which can prevent harmful deformation of the fuel tank that would impair the function of the fuel tank in either case where the pressure in the fuel tank changes to a positive pressure or to a negative pressure.

Means to Accomplish the Task

The present invention provides a structure for mounting a fuel tank on a vehicle body, including: a band lower (10L) secured to the vehicle body and holding the fuel tank (1) by extending along at least a lower wall (19L) of the fuel tank; a lower wall connecting means (40) that connects at least one part of the lower wall of the fuel tank to the band lower; a holding member (50, 10U) secured to the vehicle body and holding the fuel tank; and an upper wall connecting means (40) that connects at least one part of an upper wall of the fuel tank to the holding member.

Thereby, it becomes possible to prevent harmful deformation of the fuel tank that would impair the function of the fuel tank in either case where the pressure in the fuel tank changes to a positive pressure or to a negative pressure.

Also, the present invention may be configured such that the holding member includes a band upper (10U) that extends along the upper wall (19U) of the fuel tank (1) and surrounds the fuel tank jointly with the band lower (10L), and the upper wall connecting means (40) connects the upper wall of the fuel tank to the band upper.

Thereby, cooperation of the band lower and the band upper makes it possible to prevent the deformation of the fuel tank in either case where the pressure in the fuel tank changes to a positive pressure or to a negative pressure.

Further, the present invention may be configured such that the fuel tank (1) consists of a resin tank having recesses (32) formed on a surface thereof; and the lower wall connecting means (40) and the upper wall connecting means (40) include connected members (41) bonded to the surface of the fuel tank in the recesses.

Thereby, the recesses improve the strength of the fuel tank itself to prevent the deformation of the fuel tank. Further, the connected members are prevented from projecting out considerably from the surface of the fuel tank, and thus, the height of the structure for mounting a fuel tank on a vehicle body, including the band lower and the band upper, can be suppressed low, so that the fuel tank can be mounted on the vehicle body in a compact manner.

Further, the present invention may be configured such that each connected member (41) includes an insert bolt (42b) or an insert nut provided integrally by insert molding and a nut (44) or a bolt threadably engaged with the insert bolt (42b) or insert nut.

Thereby, it becomes possible to prevent the deformation of fuel tank at low cost and easily by use of insert molded articles, which are component parts easy to manufacture or obtain.

Further, the present invention may be configured such that each of the band lower (10L) and the band upper (10U) is provided with a through-hole through which the insert bolt (42b) or the bolt is passed, and a dimension of the through-hole is determined to define a predetermined play relative to an outer diameter of the insert bolt (42b) or the bolt passed through the through-hole, at least in a direction of extension of the band lower and the band upper.

Thereby, even if some dimensional errors are created in the fuel tank during the manufacturing process, it is possible to attach the band lower and the band upper to the connected members easily. Further, the difference in the linear expansion coefficient (namely, difference in the amount of thermal expansion) between the fuel tank made of resin and the band lower, etc. made of metal can be absorbed.

Further, the present invention may be configured such that the lower wall connecting means (40) connects the lower wall (19L) of the fuel tank (1) to the band lower (10L) via the connected members (41) in a non-contact manner, and the upper wall connecting means (40) connects the upper wall of the fuel tank to the band upper (10U) via the connected members in a non-contact manner.

Thereby, the band upper (band lower) does not contact the upper wall (lower wall) of the fuel tank and they do not interfere with each other, whereby excellent ease of assembly can be ensured. Further, since they do not contact each other, sliding movement between the band upper (band lower) and each connected member is not hindered, and generation of stress/strain due to thermal expansion and contraction of the fuel tank can be suppressed.

Further, the present invention may be configured such that the band lower (10L) and the band upper (10U) have respective flanges (18) at end portions thereof such that corresponding flanges overlap each other, and the band lower and the band upper are secured to the vehicle body at the flanges.

This makes it possible to mount the fuel tank on the vehicle body easily in a state where the fuel tank has been surrounded by the band lower and the band upper.

Further, the present invention may be configured such that the flanges (18) are each provided with an elongated hole having a major axis extending in a direction of extension of the band lower (10L) and the band upper (10U) so that the flanges can slide in a direction along the vehicle body.

Thereby, the difference in the linear expansion coefficient between the fuel tank and the band lower (band upper) is absorbed at the flanges.

Further, the present invention may be configured such that a pump module for feeding fuel is attached to the upper wall (19U) of the fuel tank (1); and a plurality of the upper wall connecting means (40) are provided in the vicinity of the pump module.

This makes it possible to prevent damage to the pump module built in the fuel tank or its peripheral part caused by deformation of the fuel tank.

Further, the present invention may be configured such that a cross-section of the band lower (10L) and the band upper (10U) is substantially hat-shaped, the cross-section perpendicularly intersecting with a direction of extension of the band lower and the band upper.

This makes it possible to improve the strength of the band lower and the band upper considerably, thereby effectively preventing the deformation of the fuel tank connected to them.

Also, the present invention provides a device for preventing deformation of a fuel tank, including: a plurality of connected members (41) provided on a surface of the fuel tank (1); and a plurality of bands (10) connected to the connected members and extending along the surface of the fuel tank, wherein the plurality of bands are connected together such that the plurality of bands extend along the surface of the fuel tank to go around the fuel tank at least one turn.

Thereby, it becomes possible to prevent harmful deformation of the fuel tank that would impair the function of the fuel tank in either case where the pressure in the fuel tank changes to a positive pressure or to a negative pressure.

Further, the present invention may be configured such that the bands (10) include: a band lower (10L) extending along a lower wall (19L) of the fuel tank and holding the fuel tank (1); and a band upper (10U) extending along an upper wall (19U) of the fuel tank and surrounding the fuel tank jointly with the band lower, wherein the connected members (41) constitute: a lower wall connecting means (40) that connects at least one part of the lower wall of the fuel tank to the band lower and an upper wall connecting means (40) that connects at least one part of the upper wall of the fuel tank to the band upper, and wherein the band lower and the band upper have respective flanges (18) at end portions thereof such that corresponding flanges overlap each other, and the band lower and the band upper are connected with each other at the flanges.

Thereby, cooperation of the band lower and the band upper, which are connected with each other at the flanges, makes it possible to prevent the deformation of the fuel tank in either case where the pressure in the fuel tank changes to a positive pressure or to a negative pressure.

Further, the present invention may be configured such that the fuel tank (1) consists of a resin tank having recesses (32) formed on a surface thereof, and the connected members (41) are disposed in the recesses.

Thereby, the recesses improve the strength of the fuel tank itself to prevent the deformation of the fuel tank. Further, the connected members are prevented from projecting out considerably from the surface of the fuel tank, and thus, the height of the device for preventing deformation of a fuel tank, including the band lower and the band upper, can be suppressed low, and the device can be configured to be compact.

Further, the present invention may be configured such that each connected member (41) comprises an insert bolt (42b) or an insert nut provided integrally by insert molding and a nut (44) or a bolt threadably engaged with the insert bolt or insert nut.

Thereby, it becomes possible to prevent the deformation of fuel tank at low cost and easily by use of insert molded articles, which are component parts easy to manufacture or obtain.

Further, the present invention may be configured such that each of the band lower (10L) and the band upper (10U) is provided with a through-hole through which the insert bolt (42b) or the bolt is passed, and a dimension of the through-hole is determined to define a predetermined play relative to an outer diameter of the insert bolt (42b) or the bolt passed therethrough, at least in a direction of extension of the band lower and the band upper.

Thereby, even if some dimensional errors are created in the fuel tank during the manufacturing process, it is possible to attach the band lower and the band upper to the connected members easily. Further, the difference in the linear expansion coefficient (namely, difference in the amount of thermal expansion) between the fuel tank made of resin and the band lower, etc. made of metal can be absorbed.

Further, the present invention may be configured such that the lower wall connecting means (40) connects the lower wall (19L) of the fuel tank (1) to the band lower (10L) via the connected members (41) in a non-contact manner, and the upper wall connecting means (40) connects the upper wall (19U) of the fuel tank to the band upper (10U) via the connected members in a non-contact manner.

Thereby, the band upper (band lower) does not contact the upper wall (lower wall) of the fuel tank and they do not interfere with each other, whereby excellent ease of assembly can be ensured. Further, since they do not contact each other, sliding movement between the band upper (band lower) and each connected member is not hindered, and generation of stress/strain due to thermal expansion and contraction of the fuel tank can be suppressed.

Further, the present invention may be configured such that the fuel tank (1) is mounted on a vehicle body via the flanges (18).

This makes it possible to mount the fuel tank on the vehicle body easily in a state where the fuel tank has been surrounded by the band lower and the band upper.

Further, the present invention may be configured such that a pump module for feeding fuel is attached to the upper wall (19U) of the fuel tank (1), and a plurality of the upper wall connecting means (40) are provided in the vicinity of the pump module.

This makes it possible to prevent damage to the pump module built in the fuel tank or its peripheral part caused by deformation of the fuel tank.

Further, the present invention may be configured such that one of the lower wall connecting means (40) connects the band lower (10L) to the lower wall (19L) at a position opposite to a position where the pump module is attached to the upper wall (19U).

This prevents the deformation of the fuel tank near the pump module mounting position, thereby preventing damage to the pump module and its peripheral mechanism.

Further, the present invention may be configured such that a cross-section of the band lower (10L) and the band upper (10U) is substantially hat-shaped, the cross-section perpendicularly intersecting with a direction of extension of the band lower and the band upper.

This makes it possible to improve the strength of the band lower and the band upper considerably, thereby effectively preventing the deformation of the fuel tank connected to them.

Effect of the Invention

According to the present invention, it becomes possible to prevent the deformation of the fuel tank and hence prevent damage to the instruments built in the fuel tank and/or to the fuel tank itself in either case where the pressure in the fuel tank changes to a positive pressure or to a negative pressure.

BRIEF DESCRIPTION OF THE DRAWINGS

FIG. 6 An explanatory diagram for explaining a process of manufacturing the fuel tank.

FIGS. 9a and 9b are cross-sectional views for explaining another exemplary structure of a connecting means.

EMBODIMENTS FOR CARRYING OUT THE INVENTION

First Embodiment

Hereinafter, a description will be made of the first embodiment of the present invention with reference to the drawings.

In the following description, when a direction is indicated, it is represented as front, rear, left, right, up or down with respect to the driver sitting in the driving seat of the motor vehicle. Further, the lateral direction may be referred to as a vehicle width direction.

Figure 1:
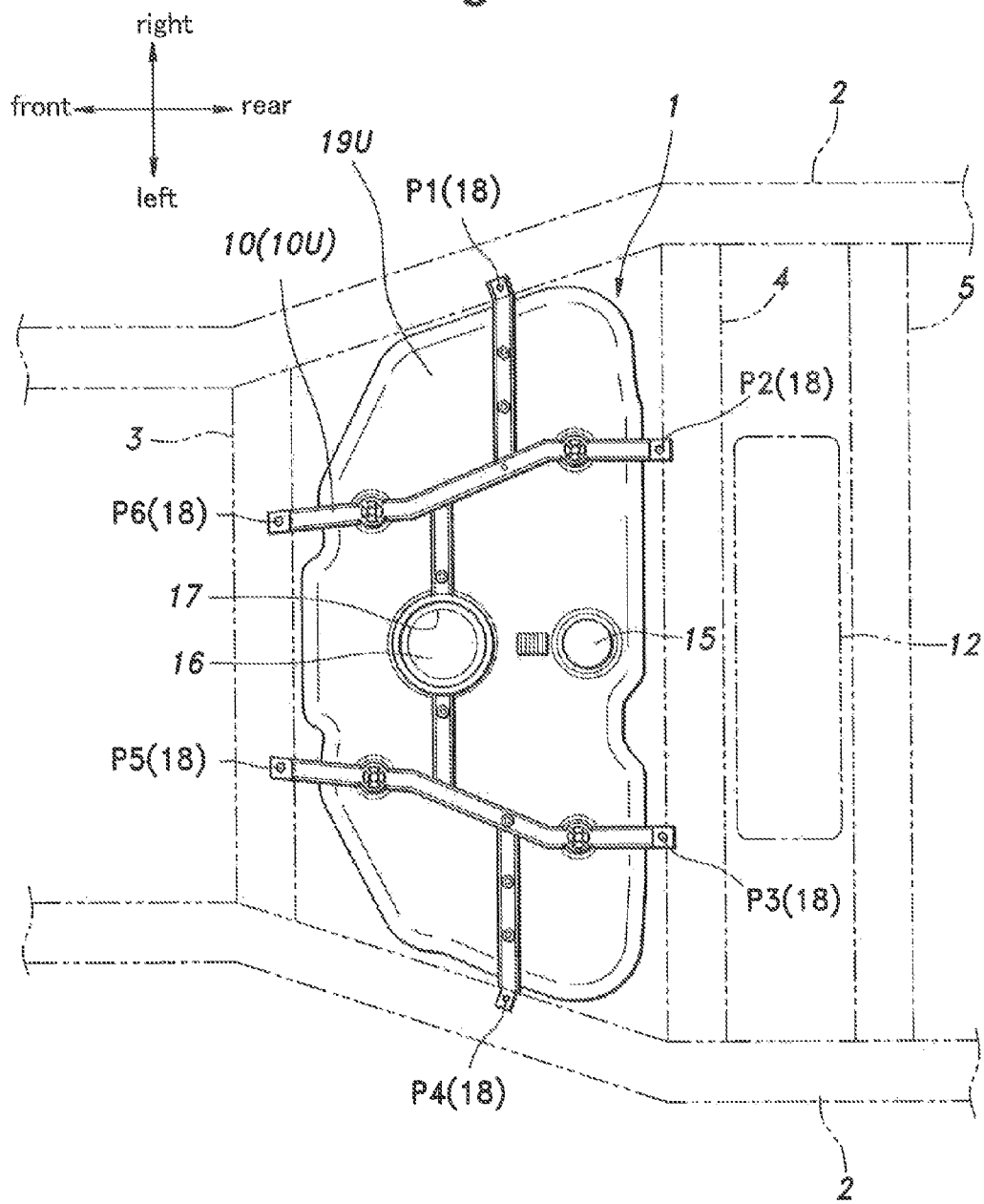
FIG. 1 A top view showing a fuel tank mounted on a vehicle body in the first embodiment of the present invention.

FIG. 1 is a top view showing a fuel tank 1 mounted on a vehicle body in the first embodiment of the present invention.

The fuel tank 1 is disposed under the floor near the rear seat such that the longitudinal direction thereof coincides with the vehicle width direction and the lateral direction thereof coincides with the fore-and-aft direction. As shown in FIG. 1, the vehicle body frame of the motor vehicle includes a pair of rear side frames 2, 2 extending on either side, and these rear side frames 2, 2 are coupled to each other by a first cross member 3, a second cross member 4 and a third cross member 5 which extend in the vehicle width direction. The fuel tank 1 is disposed between the first cross member 3 and the second cross member 4.

As shown in FIG. 1, a band upper 10U is passed along an upper wall 19U of the fuel tank 1. Though hidden from view in FIG. 1, a band lower 10L is passed along a lower wall 19L of the fuel tank 1 (see FIG. 4). (Hereinafter, the band upper 10U and the band lower 10L may be summarily referred to as a band 10.)

The fuel tank 1 is mounted to the vehicle body via the band 10. Specifically, the front end of the band 10 which is passed in the fore-and-aft direction is secured to the first cross member 3 at two points P5 and P6, while the rear end thereof is secured to the second cross member 4 at two points P2 and P3. Further, the left end and the right end of the band 10 which is also passed in the lateral direction are secured to the rear side frames 2, 2 at P1 and P4, respectively. In this way, the band upper 10U and the band lower 10L are each secured to the vehicle body and constitute a holding member that holds the fuel tank 1.

Between the second cross member 4 and the third cross member 5 is provided a canister 12. Gasoline, which is the fuel of the motor vehicle, is highly volatile, and is vaporized within the fuel tank 1 to generate gasoline vapor. If the gasoline vapor is discharged to the atmosphere, it will combine with oxygen or a nitrogen compound and change to a hazardous substance. The canister 12 is disposed between the fuel tank 1 and an engine (not shown in the drawings) and prevents the discharge of the gasoline vapor that may cause air pollution.

A cut-off valve (not shown in the drawings) is attached to the fuel tank 1 at a part indicated as a cut-off valve mounting position 15. The cut-off valve includes a valve body that discharges the gasoline vapor generated in the fuel tank 1 under normal conditions and cuts off the fuel leakage when the vehicle body turns over or the like, and the cut-off valve and the canister 12 are connected with each other by a vent tube (not shown in the drawings). The gasoline vapor discharged from the cut-off valve is adsorbed by the activated carbon or the like filled in the canister 12.

Further, the fuel tank 1 has a circular opening 17 formed at a part indicated as a pump module mounting position 16, to which a pump module (not shown in the drawings) is attached such that the pump main body is placed inside the tank. Namely, in the first embodiment, a so-called in-tank-type fuel pump is used as the pump module. It is to be noted that FIG. 1 shows a partially completed product during manufacturing process for the sake of simplicity, but the finished product is provided with a mounting flange (not shown in the drawings) for detachably covering the opening 17, and the pump module is supported on the under surface thereof via a stay (not shown in the drawings). Further, a feed pipe (not shown in the drawings) extends from the pump module to pass through the mounting flange and is connected with the engine (not shown in the drawings).

Figure 2:
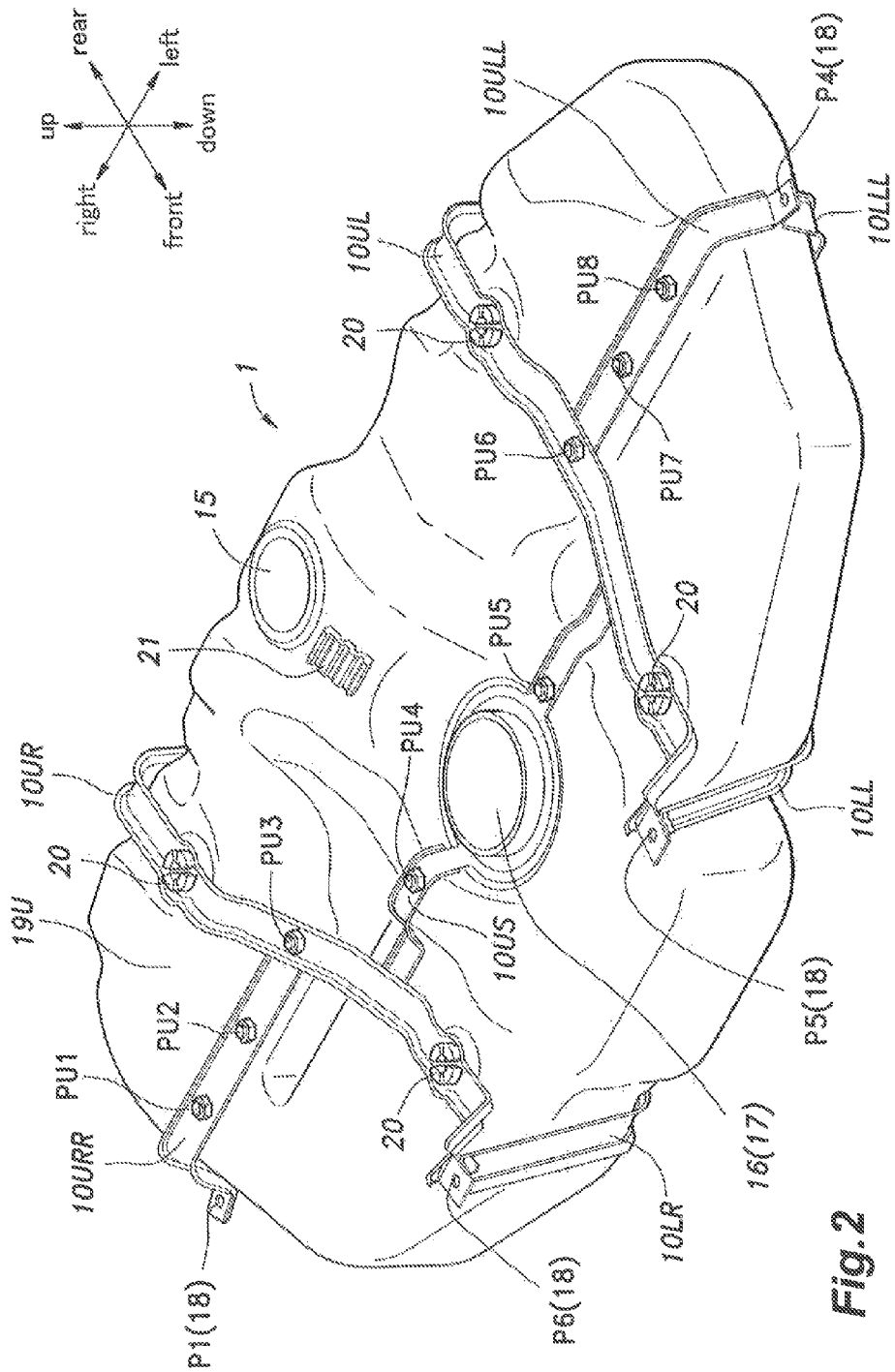
FIG. 2 A perspective view showing a structure for mounting a fuel tank on a vehicle body and an overall structure of the fuel tank according to the first embodiment of the present invention.
Figure 3:
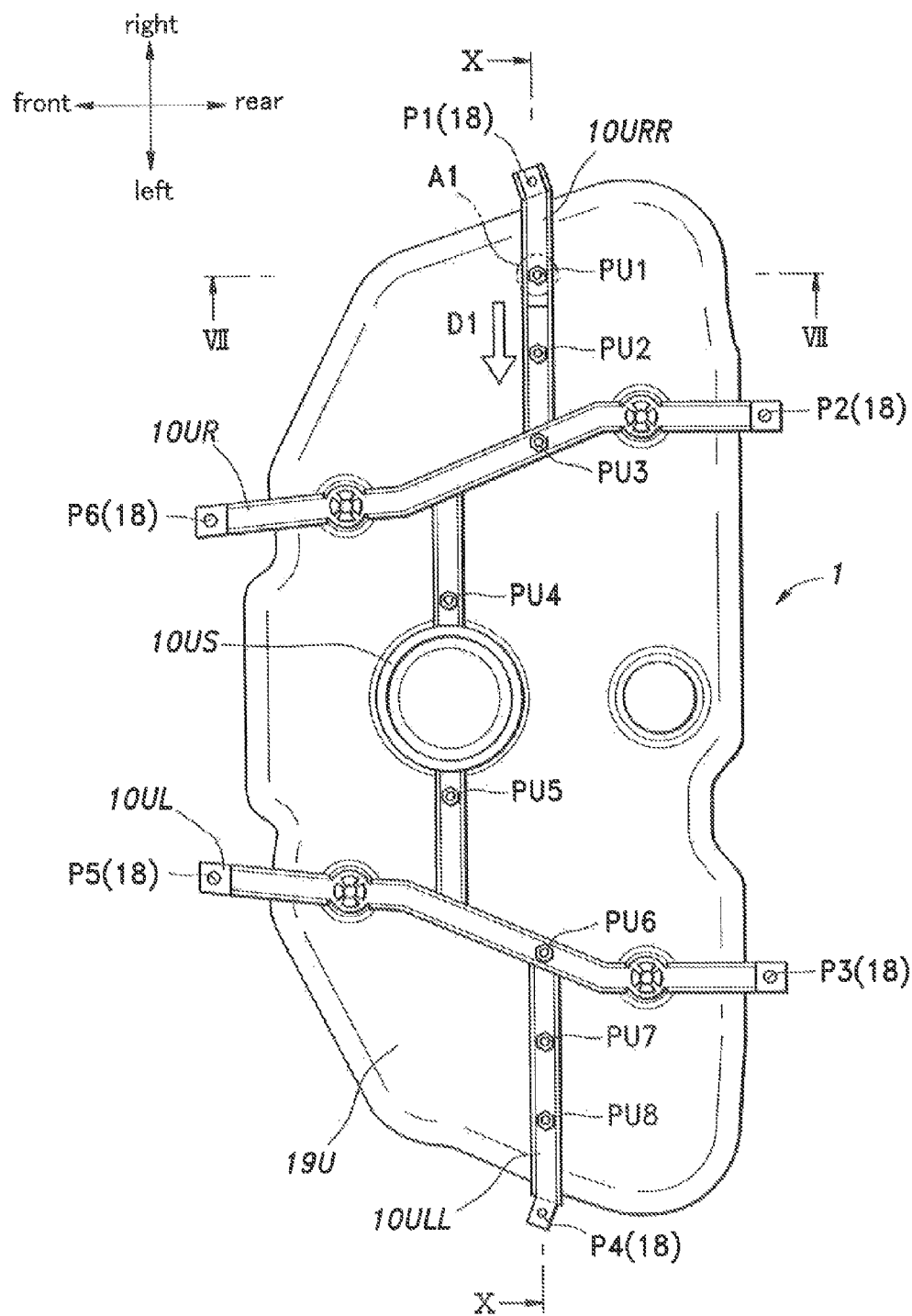
FIG. 3 A top view showing the structure for mounting a fuel tank on a vehicle body according to the first embodiment of the present invention.

FIG. 2 is a perspective view showing a structure for mounting the fuel tank 1 on a vehicle body and an overall structure of the fuel tank 1 according to the first embodiment of the present invention, and FIG. 3 is a top view showing the structure for mounting the fuel tank 1 on a vehicle body according to the first embodiment of the present invention. In the following, with reference to FIG. 2 and FIG. 3, a detailed description will be made of the structure of the band 10 surrounding the fuel tank 1, particularly the band upper 10U passed along the upper wall 19U of the fuel tank 1.

The fuel tank 1 includes the upper wall 19U and the lower wall 19L. It is to be noted that, depending on the shape of the fuel tank 1, the upper wall 19U and the lower wall 19L may not be distinguished from each other clearly. Thus, in this description, when the fuel tank 1 is divided in two in the vertical direction, the wall constituting the upper part is referred to as the upper wall 19U, and the wall constituting the lower part is referred to as the lower wall 19L. It is also to be noted that, depending on the shape of the fuel tank 1, the upper wall 19U or the lower wall 19L may form a side wall of the fuel tank 1 simultaneously.

As shown in FIG. 2 and FIG. 3, two band uppers 10UR and 10UL are passed along the upper wall 19U of the fuel tank 1 in the fore-and-aft direction. The two band uppers 10UR and 10UL are arranged to be inclined such that the distance therebetween in the vehicle width direction reduces from the rear to the front of the fuel tank 1. At a substantially middle part of the fuel tank 1 in the fore-and-aft direction, a band upper 10URR is joined to the right band upper 10UR by welding, where the band upper 10URR extends to the right of the vehicle body from this joint portion. Similarly, a band upper 10ULL is joined to the left band upper 10UL by welding, where the band upper 10ULL extends to the left of the vehicle body from this joint portion.

Further, a band upper 10US is joined by welding to a substantially middle part of each of the band upper 1 OUR and the band upper 10UL in the fore-and-aft direction, whereby the band upper 10US connects the two band uppers 10UR and 10UL with each other in the vehicle width direction. This band upper 10US is arranged such that, in the vicinity of the opening 17 at the pump module mounting position 16, it encompasses the opening 17. Namely, the band upper 10US includes an annular shape surrounding the opening 17 as viewed from above.

In the following description, the band uppers 10UR, 10UL, 10URR, 10ULL, and 10US may be summarily referred to as a band upper 10U. As described above, the band uppers 10UR, 10UL, 10URR, 10ULL and 10US are joined to each other by welding to form a unitary body, and in the structure for mounting the fuel tank 1 on a vehicle body, the band upper 10U is treated as a single component.

This band upper 10U is connected with the upper wall 19U of the fuel tank 1. Specifically, the band upper 10UR is connected with the upper wall 19U of the fuel tank 1 at PU3, the band upper 10URR at PU1 and PU2, the band upper 10UL at PU6, the band upper 10ULL at PU7 and PU8, and the band upper 10US at PU4 and PU6, to thereby constitute an upper wall connecting means. A concrete structure of this upper wall connecting means will be described in detail later.

As described above, the band upper 10US surrounds the opening 17 at the pump module mounting position 16, and the upper wall 19U of the fuel tank 1 and the band upper 10US are connected to each other at positions in the close proximity of the pump module mounting position 16 (PU4, PU5). This prevents the deformation of the fuel tank 1 particularly in the vicinity of the pump module mounting position 16, and thus, can prevent damage to the pump module as well as its peripheral mechanism (not shown in the drawings).

Namely, in the present invention, at least one part of the upper wall 19U (one of PU4 and PU5) is connected to the holding member (band upper 10U) that holds the fuel tank 1 on the vehicle body, whereby the deformation of the fuel tank 1 is locally prevented, and the damage to the instruments built in the fuel tank 1 is prevented.

Each of the two band uppers 10UR and 10UL that are passed in the fore-and-aft direction is provided with cushioning members 20 at two positions located in front and rear portions thereof. Further, a cushioning member 21 is provided at a part of the fuel tank 1 located in the middle in the vehicle width direction and close to the rear in the fore-and-aft direction.

Each cushioning member 20 is mainly made of an elastic material such as rubber, and has a downward protrusion (not shown in the drawings) at a central part thereof. The cushioning members 20 are attached to the fuel tank 1 with the protrusion being fitted in corresponding recesses (not shown in the drawings) formed in the upper wall 19U. The cushioning member 21 is a member made of rubber and having unevenness in the surface thereof, and is bonded to a part of the upper wall 19U substantially middle between the cut-off valve mounting position 15 and the pump module mounting position 16 by use of an adhesive.

These cushioning members 20, 21 come in contact with the vehicle body when the fuel tank 1 is mounted on the vehicle body, and suppress direct transmission of the oscillation of the vehicle body to the fuel tank 1. It is also possible to configure the cushioning members 20 to have a structure similar to that of the aforementioned upper wall connecting means, while additionally arranging elastic members on the vehicle body.

Figure 4:
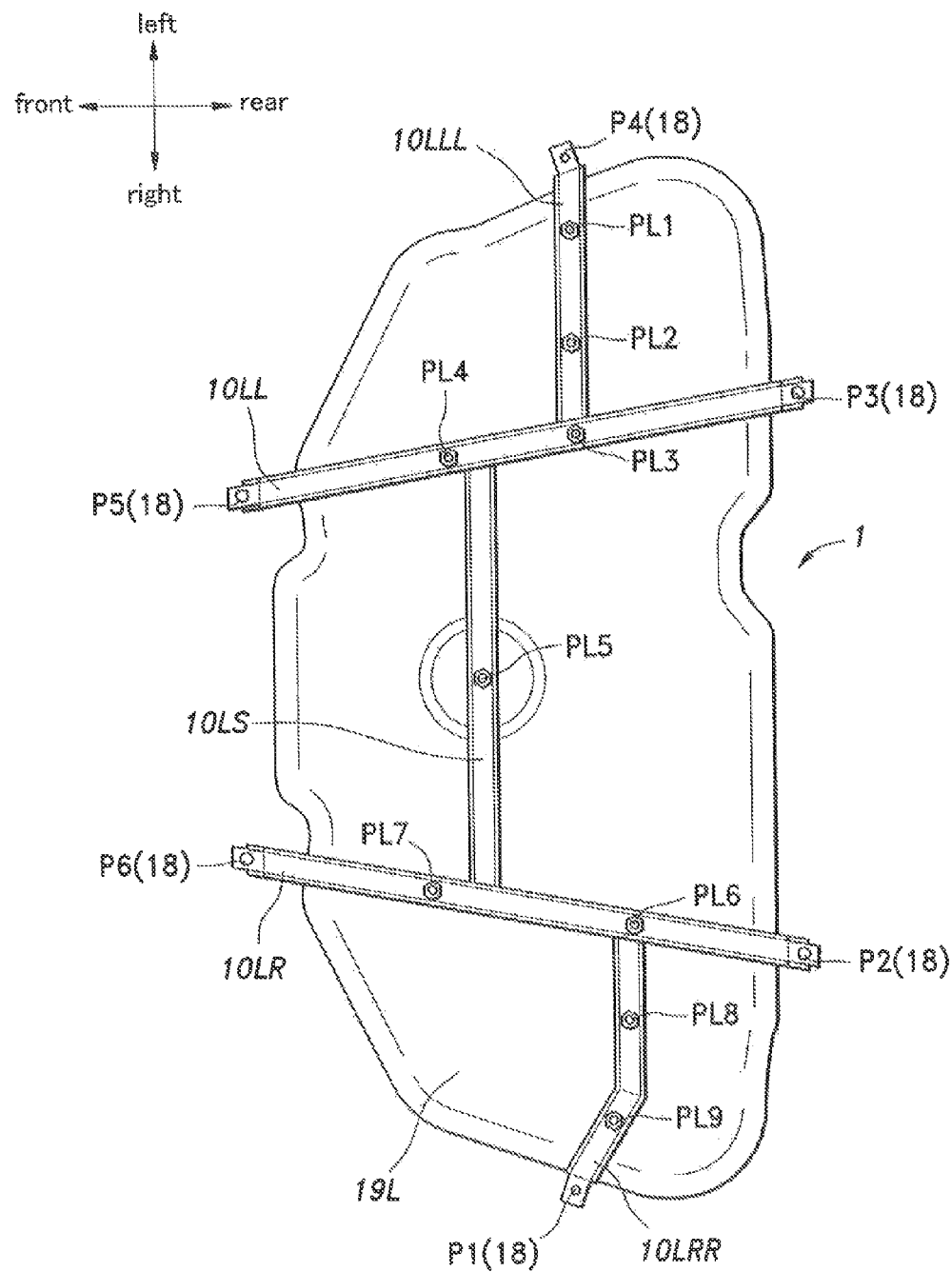
FIG. 4 A bottom view showing the structure for mounting a fuel tank on a vehicle body according to the first embodiment of the present invention.

FIG. 4 is a bottom view showing the structure for mounting the fuel tank 1 on a vehicle body according to the first embodiment of the present invention. As shown in FIG. 4, two band lowers 10LR and 10LL are passed along the lower wall 19L of the fuel tank 1 in the fore-and-aft direction. The two band lowers 10LR and 10LL are arranged to be inclined such that the distance therebetween in the vehicle width direction reduces from the rear to the front of the fuel tank 1. At a substantially middle part of the fuel tank 1 in the fore-and-aft direction, a band lower 10LRR is joined to the right band lower 10LR by welding, where the band lower 10LRR extends to the right of the vehicle body from this joint portion. Similarly, a band lower 10LLL is joined to the left band lower 10LL by welding, where the band lower 10LLL extends to the left of the vehicle body from this joint portion.

Further, a band lower 10LS is joined by welding to a substantially middle part of each of the band lower 10LR and the band lower 10LL in the fore-and-aft direction, whereby the band lower 10LS connects the two band lowers 10LR and 10LL with each other in the vehicle width direction. This band lower 10LS extends in the vehicle width direction at a position directly opposite to the pump module mounting position 16 provided in the upper wall 19U of the fuel tank 1.

In the following description, the band lowers 10LR, 10LL, 10LRR, 10LLL and 10LS may be summarily referred to as a band lower 10L. Similarly to the band upper 10U, the band lower 10L also is formed as a unitary body by welding together the band lowers, and in the structure for mounting the fuel tank 1 on a vehicle body, the band lower 10L is treated as a single component.

This band lower 10L is connected with the lower wall 19L of the fuel tank 1. Specifically, the band lower 10LR is connected with the lower wall 19L of the fuel tank 1 at PL6 and PL7, the band lower 10LRR at PL8 and PL9, the band lower 10LL at PL3 and PL4, the band lower 10LLL at PL1 and PL2, and the band lower 10LS at PL5, to thereby constituted a lower wall connecting means. A concrete structure of this lower wall connecting means will be described in detail later.

As described above, the band lower 10LS extends in the vehicle width direction at the position directly opposite to that of the pump module mounting position 16, and the lower wall 19L of the fuel tank 1 and the band lower 10LS are connected to each other at the position (PL5) directly opposite to that of the pump module mounting position 16. This prevents the deformation of the fuel tank 1 particularly in the vicinity of the pump module mounting position 16, and thus, can prevent damage to the pump module as well as its peripheral mechanism (not shown in the drawings).

Namely, in the present invention, at least one part of the lower wall 19L is connected to the holding member (the band lower 10L) that holds the fuel tank 1 on the vehicle body, whereby the deformation of the fuel tank 1 is locally prevented, and the damage to the precision instruments built in the fuel tank 1 is prevented.

Figure 5:
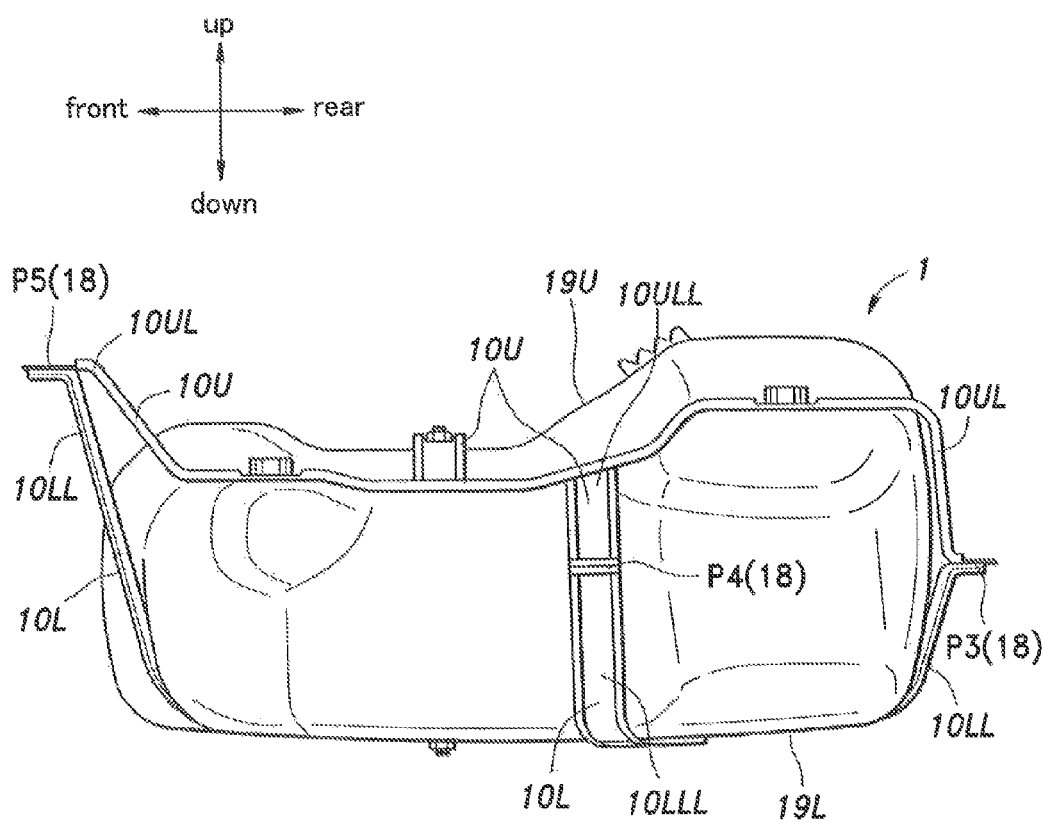
FIG. 5 A side view showing the structure for mounting a fuel tank on a vehicle body according to the first embodiment of the present invention.

FIG. 5 is a side view showing the structure for mounting the fuel tank 1 on a vehicle body according to the first embodiment of the present invention. As shown in FIG. 5, end portions of the band upper 10U that is passed along the upper wall 19U of the fuel tank 1 and end portions of the band lower 10L that is passed along the lower wall 19L are overlapped with each other to constitute flanges 18 at P3, P4, P5.

More specifically, the rear ends of the band upper 10UL and the band lower 10LL are overlapped with each other at P3, the end portions of the band upper 10ULL and the band lower 10LLL are overlapped with each other at P4, and the front ends of the band upper 10UR and the band lower 10LR are overlapped with each other at P5, and each overlapping portion forms a flange 18.

Further, more precisely, FIG. 5 shows the left side of the fuel tank 1, and in the right side of the fuel tank 1, the end portions of the band upper 10URR and the band lower 10LRR are overlapped with each other at P1, the rear ends of the band upper 10UR and the band lower 10LR are overlapped with each other at P2, and the front ends of the band upper 10UR and the band lower 10LR are overlapped with each other at P6 (see FIG. 3 and FIG. 4), and each overlapping portion constitutes a flange 18.

As described with reference to FIG. 1, the overlapping band upper 10U and band lower 10L are secured to the vehicle body at the flanges 18. Further, the band upper 10U and the band lower 10L are connected with each other at each flange 18, whereby the fuel tank 1 is generally surrounded by the band 10.

FIG. 6 is an explanatory diagram for explaining a process for manufacturing the fuel tank 1. In the first embodiment, the fuel tank 1 is manufactured by blow molding using a resin material, and has a multi-layer structure (three layers) in the direction of thickness. In the following, the process for manufacturing the fuel tank 1 will be described.

As shown in FIG. 6, a blow molding apparatus 22 for forming the fuel tank 1 by blow molding includes first to third extruders 23a, 23b, 23c that extrude molten resin, first to third dies 24a, 24b, 24c respectively connected with the first to third extruders 23a, 23b, 23c, and a blow mold 25 disposed underneath the first to third dies 24a, 24b, 24c.

The resin material extruded from the first extruder 23a forms the innermost layer of the fuel tank 1, the resin material extruded from the third extruder 23c forms the outermost layer of the fuel tank 1, and the material extruded from the second extruder 23b forms the intermediate layer of the fuel tank 1. The resin material extruded from the first extruder 23a and that extruded from the third extruder 23c are the same, and high-density polyethylene may be used therefor, for example. The resin material extruded from the second extruder 23b constitutes a barrier layer, and high-density polyethylene containing minute, thin plate-like polyamide sheets mixed therein may be used therefor, for example. By forming the fuel tank 1 to have multiple layers constituted of resins having different functions as described above, it is possible to provide the fuel tank 1 with both a fuel penetration preventing function and a mechanical strength.

The blow mold 25 is constituted of a first half 25a and a second half 25b which are openable. The first half 25a is provided with a pin hole 28 through which an air pin 27 is inserted to an inside of a cavity 26. Air is supplied to the air pin 27 from an air supply source 29.

To blow-mold the fuel tank 1, as shown in FIG. 6a, the molten resins extruded from the first to third extruders 23a, 23b, 23c are passed through the first to third dies 24a, 24b, 24c, respectively, to form a three-layered, tubular parison 100, and the parison 100 is sandwiched between the first and second halves 25a, 25b of the blow mold 25. Subsequently, as shown in FIG. 6b, the air pin 27 is inserted into the pin hole 28 of the first half 25a so that the air pin 27 pierce the parison 100, and air is supplied to the interior of the parison 100 from the air supply source 29 to expand the parison 100 and bring the parison 100 into close contact with the wall surface of the cavity 26. Then, as shown in FIG. 6c, after the blow mold 25 is cooled, the first half 25a and the second half 25b are separated from each other, whereby the molded fuel tank 1 is produced. As described above, in the blow molding, the shape of the inner surface of the fuel tank 1 is not controlled but the shape of the outer surface is determined by the mold. Thus, by improving the dimensional accuracy of the mold and setting the surface roughness appropriately, it is possible to manufacture the fuel tank 1 having a complicated shape with a predetermined surface roughness. Later-described recesses 32 (see FIG. 7) provided in the surface of the fuel tank 1 also can be formed easily by this process.

Figure 7:
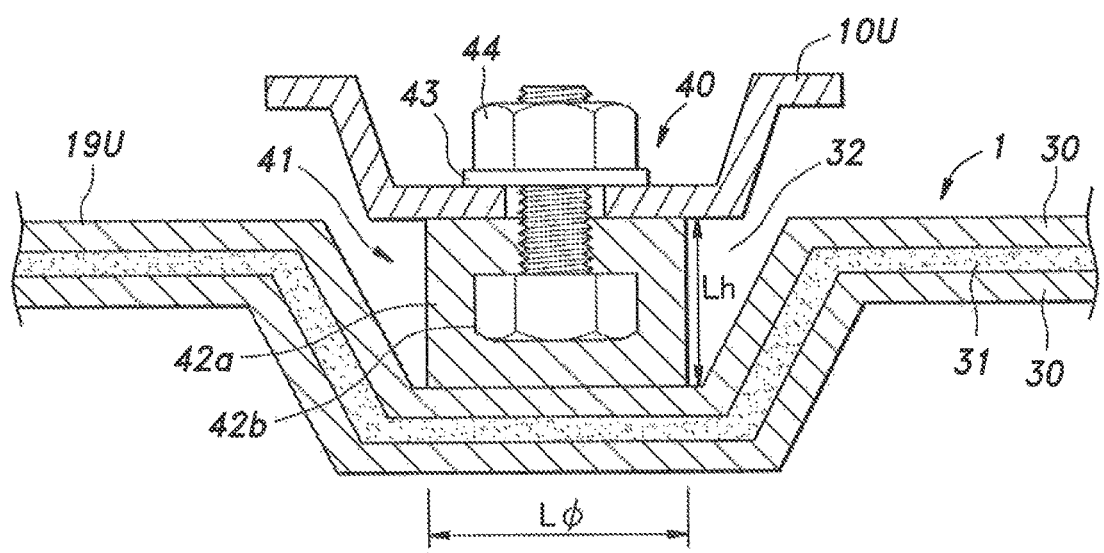
FIG. 7 A fragmentary cross-sectional view showing a relevant part of the cross-section taken along VII-VII in FIG. 3.

FIG. 7 is a fragmentary cross-sectional view showing a relevant part of the cross-section taken along VII-VII in FIG. 3. FIG. 7 shows a cross-section of a part indicated as a region A1 in FIG. 3, where the cross-section perpendicularly intersecting with the direction of extension D1 of the band upper 10URR.

In the following, with reference to FIG. 7, a detailed description will be made of the concrete structure of the upper wall connecting means and the lower wall connecting means in the first embodiment. It is to be noted that the difference between the upper wall connecting means for connecting the upper wall 19U of the fuel tank 1 to the band upper 10U and the lower wall connecting means for connecting the lower wall 19L of the fuel tank 1 to the band lower 10LL is only that the upper wall connecting means is provided on the upper side of the fuel tank 1 while the lower wall connecting means is provided on the lower side of the fuel tank 1, and therefore, in the following, a description will be mainly made of the upper wall connecting means provided on the upper wall 19U, in which the upper wall connecting means will be simply referred to as a connecting means 40.

As shown in FIG. 7, the fuel tank 1 has a three-layer structure in the direction of thickness, including a high-density polyethylene layer 30, a polyamide sheet mixed layer (barrier layer) 31, and another high-density polyethylene layer 30 which are stacked in this order from the inner side. The high-density polyethylene layers 30 have excellent mechanical strength, while the polyamide sheet mixed layer 31 has an excellent barrier property against alcohols and hydrocarbons such as gasoline.

The connecting means 40 is constituted of a connected member 41 having an insert bolt 42b insert molded in a base 42a made of high-density polyethylene, for example, and a washer 43 and a nut 44 threadably engaged with the insert bolt 42b to connect the connected member 41 to the band upper 10U. The connected member 41 is configured such that the shaft of the insert bolt 42b projects out from the base 42a. The base 42a that constitutes the connected member 41 is circular in shape as viewed from above (see FIG. 8) and has outer dimensions with a diameter L$\phi$ of 20 mm and a height Lh of 10 mm, for example.

In the following, a description will be made of the structure in which the insert bolt 42b is provided in the base 42a of the connected member 41, though instead of such a structure, it may be possible to adopt a structure in which an insert nut (not shown in the drawings) is insert molded in the base 42a such that the band upper 10U is connected to the connected member 41 by use of the washer 43 and a bolt (not shown in the drawings) (this also applies to the second embodiment). It is to be noted, however, that in the case where the insert nut is used, the bolt is tightened after the band upper 10U has been put in place, and if the tightening torque is too large, the shaft of the bolt may damage the fuel tank 1, and hence, the tightening torque should be controlled more appropriately.

The connected member 41 is bonded by heat welding to a bottom of a recess 32 provided to the upper wall 19U of the fuel tank 1 and having a tapered side surface. The provision of the recess 32 in the fuel tank 1 improves the mechanical strength of the fuel tank 1 itself. Further, the structure in which the connected member 41 is bonded to the bottom of the recess 32 prevents the connected member 41 from projecting out considerably from the upper wall 19U of the fuel tank 1, and therefore, when the band upper 10U is connected to the connected member 41, the overall height of the structure for mounting the fuel tank 1 on the vehicle body can be suppressed low, so that the fuel tank 1 can be mounted on the vehicle body in a compact manner.

Further, as the material of the connected member 41 and the material of the outermost layer of the fuel tank 1 are both high-density polyethylene, the same materials are bonded together very firmly by heat welding at the molecular level. Instead of heat welding, it is also possible to use high frequency welding or ultrasonic welding. With either method, the materials can be bonded together firmly at the molecular level.

It is to be noted that, so long as a sufficient bonding strength is obtained, the connected member 41 may be bonded to the fuel tank 1 by use of an adhesive, for example.

The band upper 10U is obtained by press forming a cold-rolled steel plate having a tensile strength of 270 N/mm$^2$ or more, for example. It is to be noted that what is obtained by the press forming is individual parts constituting the band upper 10U described above (see FIG. 2, FIG. 3, etc.). By connecting these parts together by welding, the band upper 10U in the final form is obtained. It is of course possible to manufacture the whole band upper 10U by press forming at a time. The thickness t of the band upper 10U may preferably be about 1.5 mm. As shown in the drawing, the band upper 10U has a so-called hat-shaped cross-section to ensure a sufficient rigidity against bending stress.

Thus, in the mounting structure for the fuel tank 1 according to the first embodiment, the upper wall connecting means (lower wall connecting means) 40 connects the connected member 41 provided to the upper wall 19U (lower wall 19L) of the fuel tank 1 to the band upper 10U (band lower 10L). The band upper 10U (band lower 10L) itself has a high rigidity, and since such a highly rigid member generally surrounds the fuel tank 1, the deformation of the fuel tank 1 is regulated from outside such that the fuel tank 1 does not expand or contract due to a change in the internal pressure thereof.

Figure 8A:
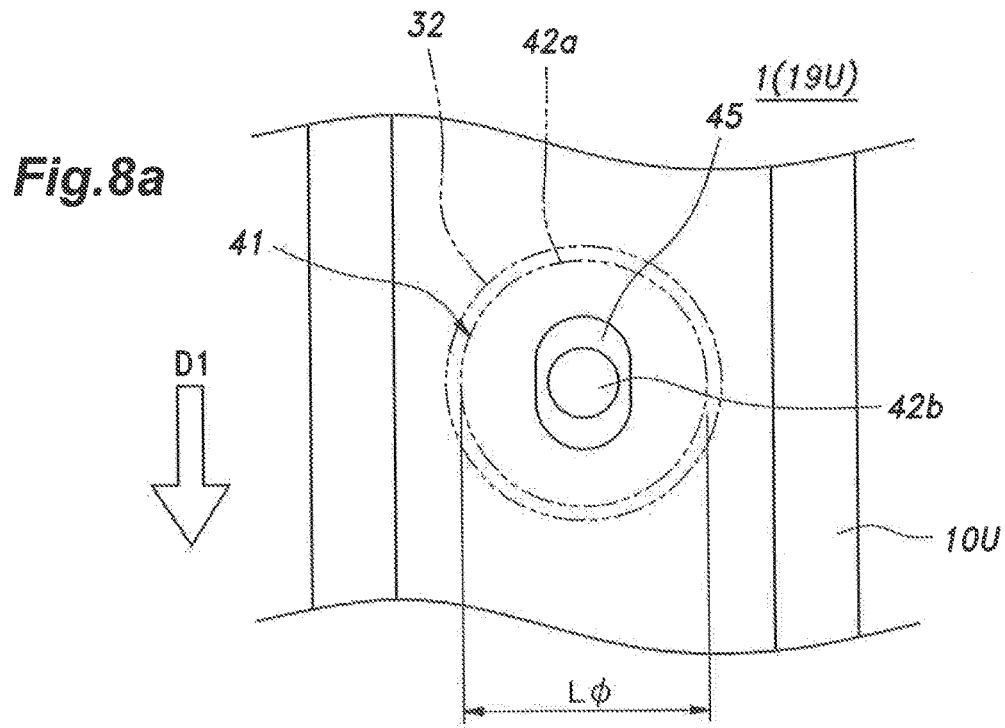
FIGS. 8a and 8b are top views showing the structure of a region A1 in FIG. 3.
Figure 8B:
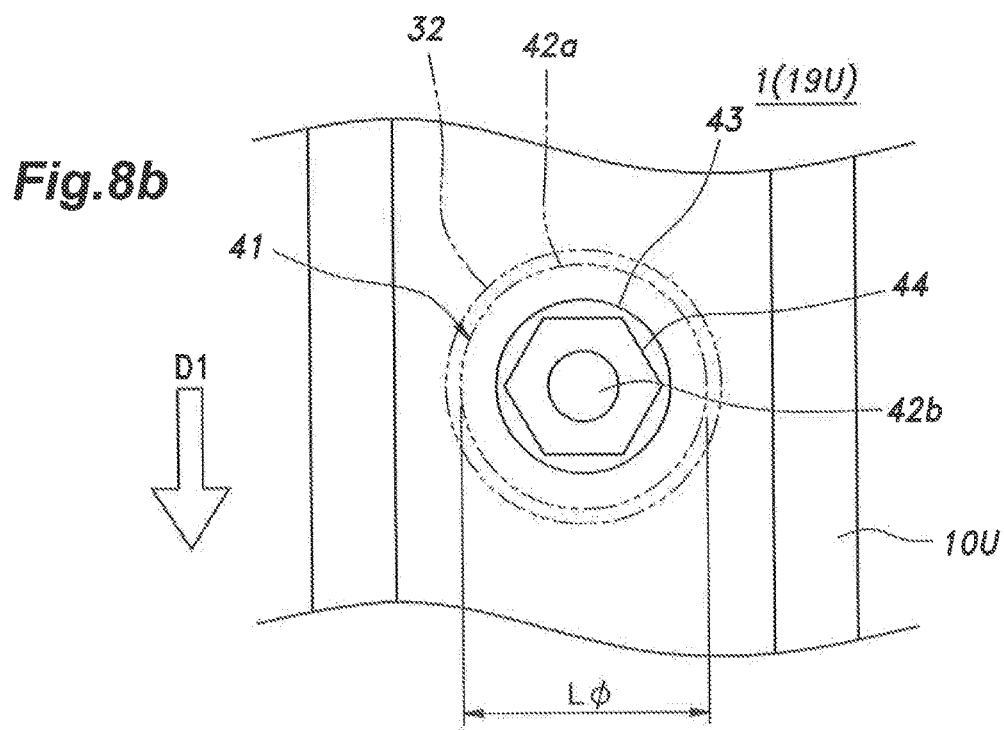

FIGS. 8a and 8b are top views showing the structure of the region A1 in FIG. 3. FIG. 8a shows a state in which the band upper 10U is placed on the connected member 41 constituting the connecting means 40, and FIG. 8b shows a state in which the washer 43 and the nut 44 are engaged with the insert bolt 42b of the connected member 41 after the state of FIG. 8a; namely, a state in which the fuel tank 1 (here, the upper wall 19U) has been connected to the band upper 10U. In the states shown in FIGS. 8a and 8b, the band upper 10U hides the structure below it, and thus, the recess 32 formed in the surface of the fuel tank 1, the connected member 41 and the base 42a are shown by imaginary lines (two-dot chain lines).

As shown in FIG. 8a, the band upper 10U is provided with a through-hole 45 in which the insert bolt 42b is to be inserted. The through-hole 45 is provided as an elongated hole having a major axis extending in the direction of extension D1 of the band upper 10U. By forming the through-hole 45 as an elongated hole to create play, it is possible to mount the band upper 10U to the connected member 41 easily even if there are dimensional errors in the fuel tank 1 caused during manufacture.

As shown in FIG. 7 and FIG. 8b, the band upper 10U through which the insert bolt 42b has been passed is fastened to the connected member 41 by means of the washer 43 and the nut 44, whereby the upper wall 19U of the fuel tank 1 is connected with the band upper 10U.

It is preferred here to control the tightening torque when threadably engaging the nut 44 with the insert bolt 42b such that the connected member 41 and the band upper 10U are displaceable relative to each other along the surface of the fuel tank 1. Thereby, the fuel tank 1 is allowed to deform in the direction of the extension of the band upper 10U within a range restricted by the through-hole 45 provided as an elongated hole. In this case, it is preferred that after the nut 44 has been tightened, an anaerobic adhesive be injected between the insert bolt 42b and the nut 44 to lock them together (prevent loosening).

The linear expansion coefficient of polyethylene forming the fuel tank 1 is 12 to $14\times10^{-5}/°$ C. In contrast, the linear expansion coefficient of the metal forming the band upper 10U is $1.17\times10^{-5}/°$ C. if the metal is cold-rolled steel plate, and $0.9\times10^{-5}/°$ C. if the metal is nickel steel. Thus, there is a large difference in the thermal expansion coefficient between resin and metal, and the amount of deformation caused by the expansion accumulates with the length of an object. Namely, in the fuel tank 1, the amount of deformation is large in the circumferential direction (the larger the length of the part along which the band upper 10U is passed, the larger the amount of deformation is), and in a case where the fuel tank 1 is restrained at multiple points in the direction of deformation (here, principally in the direction of extension of the band upper 10U), stress/strain is generated between restraint points. In the first embodiment, each through-hole 45 formed in the band upper 10U is configured to be elongated in the direction of extension of the band upper 10U, so that the relative displacement between the band upper 10U and the fuel tank 1 is allowed by the through-holes 45, and therefore the difference in the linear expansion coefficient between them due to the difference in the material is absorbed.

It is to be noted that each flange 18 described above is also provided with a through-hole (not shown in the drawings) for mounting the fuel tank 1 to the vehicle body, and the through-hole of each flange 18 also is formed as an elongated hole having a major axis extending in the direction of extension of the band upper 10U. Thus, by configuring the flanges 18 to have a structure similar to that for connecting the connected member 41 to the band upper 10U, the flanges 18 are allowed to slide in the direction along the bottom surface of the vehicle body so that the difference in the linear expansion coefficient is eventually absorbed by the flanges 18.

Namely, while suppressing the deformation of the fuel tank 1 in the direction of thickness such as the expansion and contraction of the fuel tank 1 in response to the change in the internal pressure, the band upper 10U eliminates the stress/ strain caused by the difference in the linear expansion coefficient between the fuel tank 1 and the band upper 10U.

As the washers 43, washers made of metal may be used, but instead of them (or together with them), it is also possible to use highly slidable washers made of nylon or polytetrafluoroethylene, for example, such that the band upper 10U is sandwiched by the highly slidable washers in the vertical direction. By improving the slidability in this way, it is possible to further suppress the generation of stress/strain due to the difference in the linear expansion coefficient between the fuel tank 1 and the band upper 10U.

In the first embodiment, each through-hole 45 is formed as a hole elongated in the direction of extension of the band upper 10U. However, it is possible to determine the dimensions of the major and minor axes of each through-hole 45 provided to the band upper 10U depending on the position thereof on the fuel tank 1 after analyzing the deformation of the fuel tank 1 and the band upper 10U caused by thermal expansion through simulation or the like.

FIGS. 9a and 9b are cross-sectional views for explaining another exemplary structure of the connecting means 40.

In FIG. 7, the connected member 41 constituting the connecting means 40 is secured to the recess 32 formed in the surface of the fuel tank 1, but in FIG. 9a, the connected member 41 is welded to a flat surface of the fuel tank 1.

In the blow molding explained with reference to FIG. 6, the parison 100 is pressed against the blow mold 25 to shape the resin (see FIG. 6), and therefore, if the unevenness on the surface of the mold is large, the thickness of the parison 100 may become locally thin resulting in a reduced strength. Therefore, if there is a large unevenness around a part of the fuel tank 1 where the connected member 41 is to be disposed, it may be preferred not to provide the recess 32 at that part so that the fuel tank 1 has a flat surface as shown in FIG. 9a, and to dispose the connected member 41 on the flat surface.

In FIG. 9b, the fuel tank 1 is provided with a protrusion 33, and the connected member 41 is welded to the protrusion 33. As shown in FIG. 2, the fuel tank 1 includes various functional components attached thereto or built therein, such as the pump module and the cut-off valve (both not shown in the drawings). It is to be noted here that when the connecting means 40 is disposed at positions where the deformation of the fuel tank 1 should be suppressed, the connecting means 40 may physically interfere with these functional components. To avoid this physical interference, it may be possible to arrange the connecting means 40 and the band upper 10U so as to get around the functional components, but this may result in failure to effectively prevent the deformation of the fuel tank 1.

In such a case, by providing the fuel tank 1 with the protrusion 33 and welding the connected member 41 to the protrusion 33 as shown in FIG. 9b, it may become possible to ensure a distance from a functional component and thereby avoid the physical interference.

Further, in the case where the fuel tank 1 and the band lower 10LS are connected to each other at a position (PL5) directly opposite to the pump module mounting position 16 as described with reference to FIG. 4, if the fuel tank 1 is provided with the protrusion 33 and the connected member 41 is disposed on the top surface thereof, spatial interference with the pump module (not shown in the drawings) built in the fuel tank 1 can be avoided.

Figure 10A:
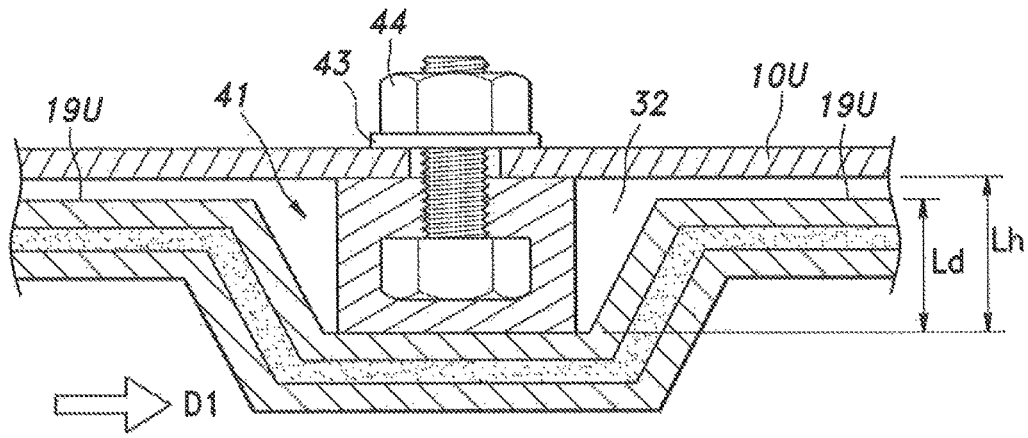
FIGS. 10a to 10c are fragmentary cross-sectional views showing a relevant part of the cross-section taken along X-X in FIG. 3.
Figure 10B:
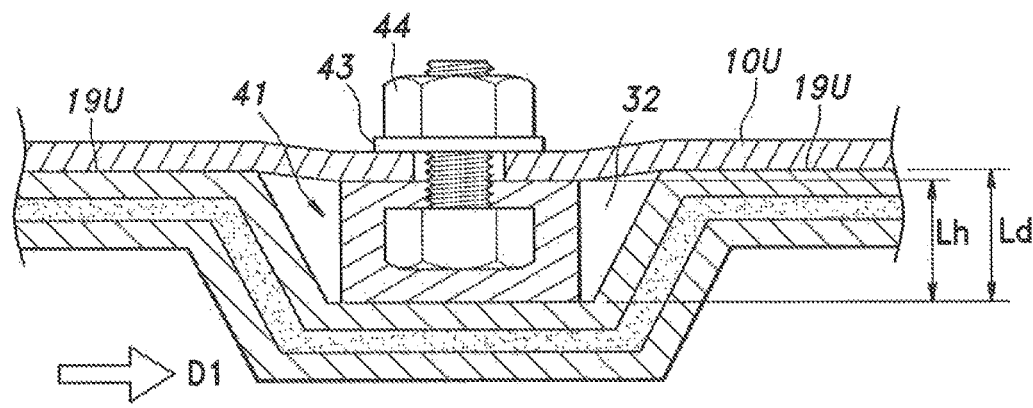
Figure 10C:
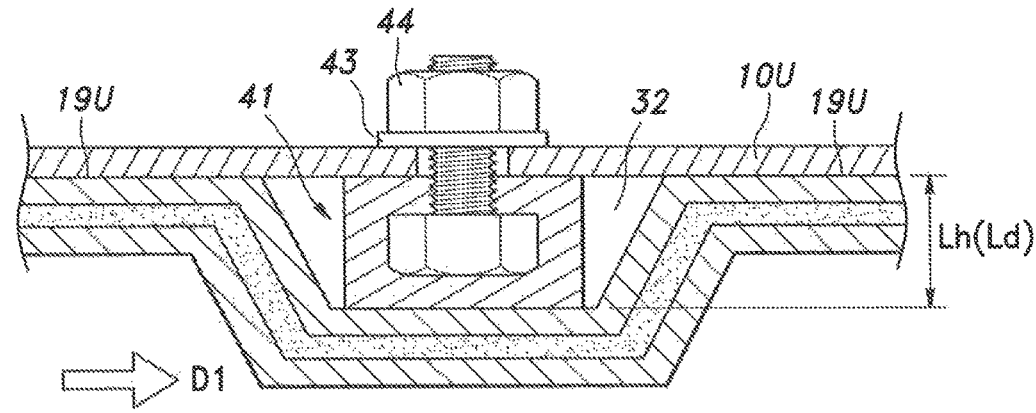

FIGS. 10a, 10b and 10c are fragmentary cross-sectional views showing a relevant part of the cross-section taken along X-X in FIG. 3, where the cross-section extends along the direction of extension D1 of the band upper 10U in the region A1 shown in FIG. 3.

In the following description, the distance from the upper wall 19U of the fuel tank 1 to the bottom of the recess 32 will be referred to as a recess depth Ld, and the height of the connected member 41 welded to the bottom of the recess 32 will be referred to as a connected member height Lh. As is described above, the cross-section of the band upper 10U perpendicularly intersecting with the direction of extension D1 of the band upper 10U has a hat-like shape (see FIG. 7), and therefore, to be accurate, an upward extending part of the band upper 10U forming one of the "legs" of the hat-shaped cross-section is seen behind the washer 43 and the nut 44 in the cross-sections of FIGS. 10a to 10c. However, for the sake of simplicity, the upward extending part is not shown in FIGS. 10a to 10c.

FIG. 10a shows a positional relationship between the upper wall 19U of the fuel tank 1 and the band upper 10U in a case where the recess depth Ld is smaller than the connected member height Lh. In this case, the connected member 41 projects from the upper wall 19U, whereby the band upper 10U and the upper wall 19U connected thereto are spaced from each other.

In the first embodiment, the dimensions (connected member height Lh) of the connected member 41 including the tolerance at the time of manufacture are determined such that the positional relationship between the upper wall 19U of the fuel tank 1 and the band upper 10U is always that shown in FIG. 10a. Thereby, when the band upper 10U and the connected member 41 are connected to each other, the band upper 10U does not contact the upper wall 19U of the fuel tank 1 and they do not interfere with each other, whereby excellent ease of assembly can be ensured. Further, because the band upper 10U does not contact the upper wall 19U of the fuel tank 1, in the case where the tightening torque of the nuts 44 is controlled as described above or where highly slidable washers are used as the washers 43, for example, the sliding movement between the band upper 10U and the connected member 41 is not hindered and it is possible to suppress generation of stress/strain due to thermal expansion and contraction of the fuel tank 1 itself.

FIG. 10b shows a positional relationship between the upper wall 19U of the fuel tank 1 and the band upper 10U in a case where the recess depth Ld is larger than the connected member height Lh. In this case, the height of the connected member 41 does not reach the upper wall 19U, and the band upper 10U is depressed slightly into an interior of the recess 32 when connected to the connected member 41. In this structure, it becomes difficult for the band upper 10U and the connected member 41 to slide relative to each other, but the expanding deformation of the fuel tank 1 is prevented as much as possible when the internal pressure of the fuel tank 1 becomes positive.

FIG. 10c shows a positional relationship between the upper wall 19U of the fuel tank 1 and the band upper 10U in a case where the recess depth Ld is equal to the connected member height Lh. In this case, the upper wall 19U and the connected member 41 are on the same plane, and the band upper 10U and the upper wall 19U connected thereto are in contact with each other, ideally without pressing each other. In practice, the recess depth Ld and the connected member height Lh vary within the tolerance, and it is practically impossible to always maintain the positional relationship shown in FIG. 10c. However, if the design and manufacture is performed such that the relationship of the recess depth Ld being equal to the connected member height Lh holds for their central values determined taking into account the tolerance, and a high slidability between the upper wall 19U and the band upper 10U is achieved by, for example, putting a highly slidable tape on a side of the band upper 10U facing the upper wall 19U or by plating the band upper 10U to form a highly slidable (or self-lubricating) film thereon, it is possible to suppress generation of stress/strain due to thermal expansion and contraction of the fuel tank 1 itself, and to suppress a minute expanding deformation of the fuel tank 1 due to an increase in the internal pressure.

In the foregoing, a detailed description has been made of the upper wall connecting means that connects the upper wall 19U of the fuel tank 1 to the band upper 10U. The only difference between the upper wall connecting means described above and the lower wall connecting means for connecting the lower wall 19L of the fuel tank 1 to the band lower 10L is that the upper wall connecting means is provided on the upper side of the fuel tank 1 while the lower wall connecting means is provided on the lower side of the fuel tank 1, and therefore, a detailed description of the lower wall connecting means is omitted.

As described above, with the structure in which the band 10 is connected to the fuel tank 1 with the upper wall connecting means and the lower wall connecting means such that the band 10 surrounds the tank 1, and the tank 1 is mounted to the vehicle via the flanges 18 of the band 10, the deformation of the fuel tank 1 is effectively prevented in either case where the pressure in the fuel tank 1 changes to a positive pressure or to a negative pressure.

It is to be noted that in the first embodiment, the present invention has been described in detail as a structure for mounting the fuel tank 1 on a vehicle body. However, as is apparent from the foregoing description, the present invention simply has an aspect of "a device for preventing deformation of a fuel tank" (namely, the fuel tank 1 does not necessarily have to be mounted on the vehicle body). According to this point of view, the present invention can be grasped as a device for preventing deformation of a fuel tank 1, including: a plurality of connected members 41 provided on a surface of the fuel tank 1; and a plurality of bands 10 (band upper 10U and band lower 10L) connected to the connected members 41 and extending along the surface of the fuel tank, wherein the plurality of bands 10 are connected together such that the plurality of bands 10 extend along the surface of the fuel tank 1 to go around the fuel tank 1 at least one turn.

Second Embodiment

In the following, a description will be made of the second embodiment of the present invention with reference to the drawings.

Figure 11:
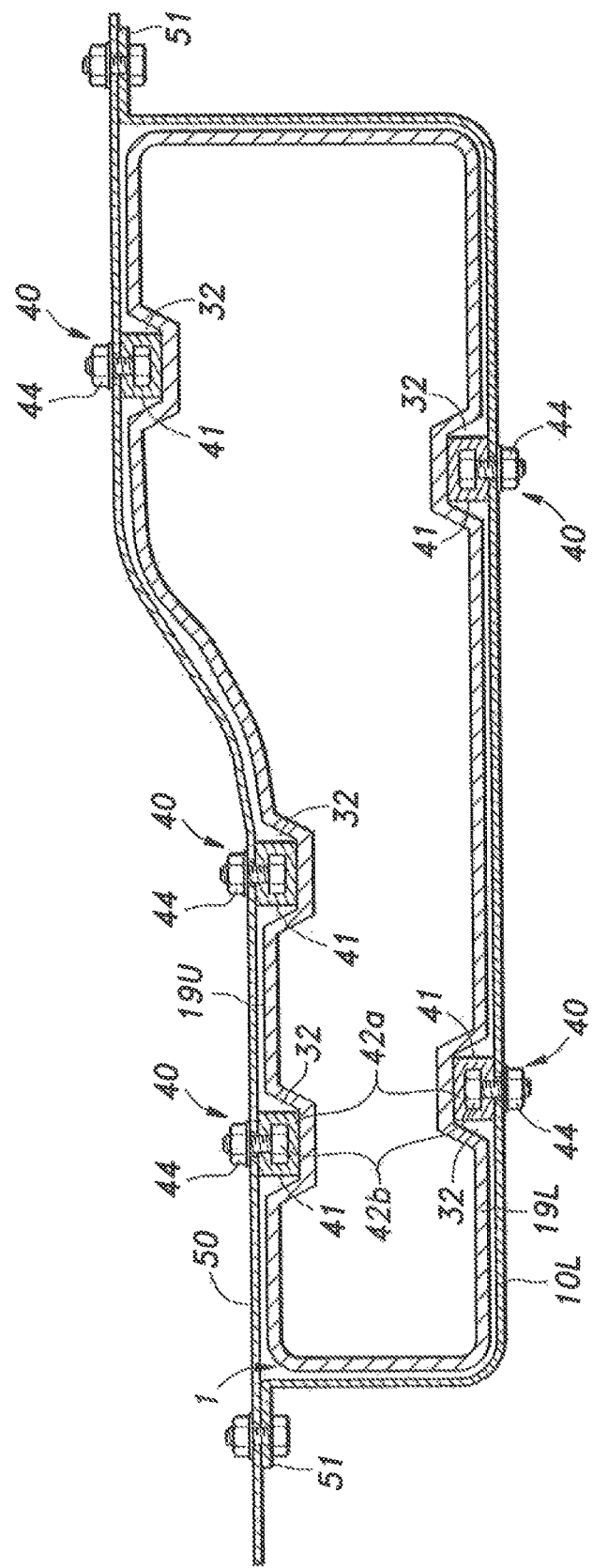
FIG. 11 A cross-sectional view schematically showing a structure for mounting a fuel tank on a vehicle body according to the second embodiment of the present invention.

FIG. 11 is a cross-sectional view schematically showing a structure for mounting the fuel tank 1 on a vehicle body according to the second embodiment of the present invention.

In the first embodiment, the fuel tank 1 is surrounded by the band upper 10U and the band lower 10L as a shape retaining device, whereby the deformation of the fuel tank 1 is prevented. However, the structure for mounting the fuel tank 1 on a vehicle body in the second embodiment does not include an independent band upper 10U, and its biggest feature is that the band upper 10U is substituted with a structural member of the main body of the vehicle body.

In FIG. 11, similarly to the first embodiment, the fuel tank 1 has a three-layer structure (not shown in the drawings), and the upper wall 19U and the lower wall 19L thereof are provided with multiple recesses 32 each having a tapered side surface. To the bottom of each recess 32 is secured a connected member 41 by welding, where the connected member 41 constitutes a connecting means 40. Further, an insert bolt 42b is embedded in the base 42a of each connected member 41 by insert molding.

In the lower wall 19L of the fuel tank 1, the connected members 41 are connected to the band lower 10L by means of the insert bolts 42b and the nuts 44. Further, the band lower 10L is secured to a vehicle body structural member 50 by means of flanges 51 provided at end portions thereof.

It is to be noted here that the vehicle body structural member 50 refers to a holding member, such as the rear side frame 2, either of the first cross member 3, the second cross member 4 and the third cross member 5, which were described above with reference to FIG. 1, or a floor panel, stiffener, flange, etc. connected to these members, where the structural member has a rigidity at least higher than that of the upper wall 19U of the fuel tank 1. The fuel tank 1 is eventually held by this holding member.

On the other hand, with regard to the upper wall 19U of the fuel tank 1, the connected members 41 are directly connected to the vehicle body structural member 50 by means of the insert bolts 42b and the nuts 44. Thus, a band upper is not disposed on the side of the upper wall 19U, and flanges for attaching the band upper to the vehicle body are not provided either. Thereby, in comparison with the first embodiment, it is possible to mount the fuel tank 1 to the vehicle body in a more compact manner owing to the absence of the band upper, while achieving similar effects to those of the first embodiment.

In the foregoing, the present invention has been described in terms of specific embodiments thereof, but these embodiments are mere examples and the present invention is not limited to these embodiments.

For instance, in the above embodiments, the upper wall 19U was connected to the band upper 10U and the lower wall 19L was connected to the band lower 10L, but the present invention is also applicable to a fuel tank in that the upper wall 19U and the lower wall 19L each constitute a side surface (namely, a fuel tank arranged such that the longitudinal direction thereof coincides with the direction of height).

Further, the use of the structure for mounting a fuel tank on a vehicle body according to the present invention (namely, objects on which the fuel tank is mounted) is not limited to passenger vehicles. It is also to be noted that not all of the structural elements illustrated in the above embodiments are necessarily indispensable, and they may be selectively used as appropriate at least within the scope of the present invention.

INDUSTRIAL APPLICABILITY

The structure for mounting a fuel tank on a vehicle body according to the present invention makes it possible, with a simple structure, to prevent the deformation of the fuel tank and hence prevent damage to the precision instruments built in the fuel tank in either case where the pressure in the fuel tank changes to a positive pressure or to a negative pressure, and therefore, can be used favorably in passenger vehicles having a fuel tank, for example.

GLOSSARY 1 fuel tank
2 rear side frame 3 first cross member
4 second cross member
5 third cross member
10 band
10U band upper (holding member)
10UR, 10UL, 10URR, 10URR, 10US band upper
10L, 10LR, 10LL, 10LRR, 10LLL, 10LS band lower
15 cut-off valve mounting position
16 pump module mounting position
17 opening
18 flange
19U upper wall
19L lower wall
30 high-density polyethylene layer
31 polyamide sheet mixed layer
32 recess
40 connecting means (upper wall connecting means, lower wall connecting means)
41 connected member
42a base
42b insert bolt
43 washer
44 nut
45 through-hole
50 vehicle body structural member (holding member)
51 flange

The invention claimed is:

1. A device for preventing deformation of a fuel tank, comprising:
a plurality of connected members provided on a surface of the fuel tank; and
a plurality of bands connected to the connected members and extending along the surface of the fuel tank,
wherein the plurality of bands are connected together such that the plurality of bands extend along the surface of the fuel tank to surround the fuel tank,
wherein the plurality of bands comprise:
a lower band extending along a lower wall of the fuel tank and holding the fuel tank; and
an upper band extending along an upper wall of the fuel tank and surrounding the fuel tank jointly with the lower band,
wherein the connected members constitute a lower wall connector that connects at least one part of the lower wall of the fuel tank to the lower band and an upper wall connector that connects at least one part of the upper wall of the fuel tank to the upper band, and wherein the lower band and the upper band have respective flanges at end portions thereof such that corresponding flanges overlap each other, and the lower band and the upper band are connected with each other at the flanges.

2. The device according to claim 1, wherein the fuel tank consists of a resin tank having recesses formed on a surface thereof, and the connected members are disposed in the recesses.

3. The device according to claim 2, wherein each connected member comprises a base made of resin and an insert bolt or an insert nut provided integrally with the base by insert molding and the device for preventing deformation further comprises a nut or a bolt threadably engaged with the insert bolt or insert nut.

4. The device according to claim 3, wherein:
each of the lower band and the upper band is provided with a through-hole through which the insert bolt or the bolt is passed; and
a dimension of the through-hole is determined to define a predetermined play relative to an outer diameter of the insert bolt or the bolt passed therethrough, at least in a direction of extension of a part of the lower band and the upper band where the through-hole is provided.

5. The device according to claim 2, wherein the lower wall connector connects the lower wall of the fuel tank to the lower band via the connected members in a non-contact manner, and the upper wall connector connects the upper wall of the fuel tank to the upper band via the connected members in a non-contact manner.

6. The device according to claim 1, wherein the fuel tank is mounted on a vehicle body via the flanges.

7. The device according to claim 1, wherein:
a pump module for feeding fuel is attached to the upper wall of the fuel tank; and
a plurality of the upper wall connectors are provided in the vicinity of the pump module.

8. The device according to claim 7, wherein one of the lower wall connector connects the lower band to the lower wall at a position opposite to a position where the pump module is attached to the upper wall.

9. The device according to claim 1, wherein a cross-section of at least a part of the lower band and the upper band is substantially hat-shaped, the cross-section perpendicularly intersecting with a direction of extension of the at least a part of the lower band and the upper band.

* * * * *